Figure 1:
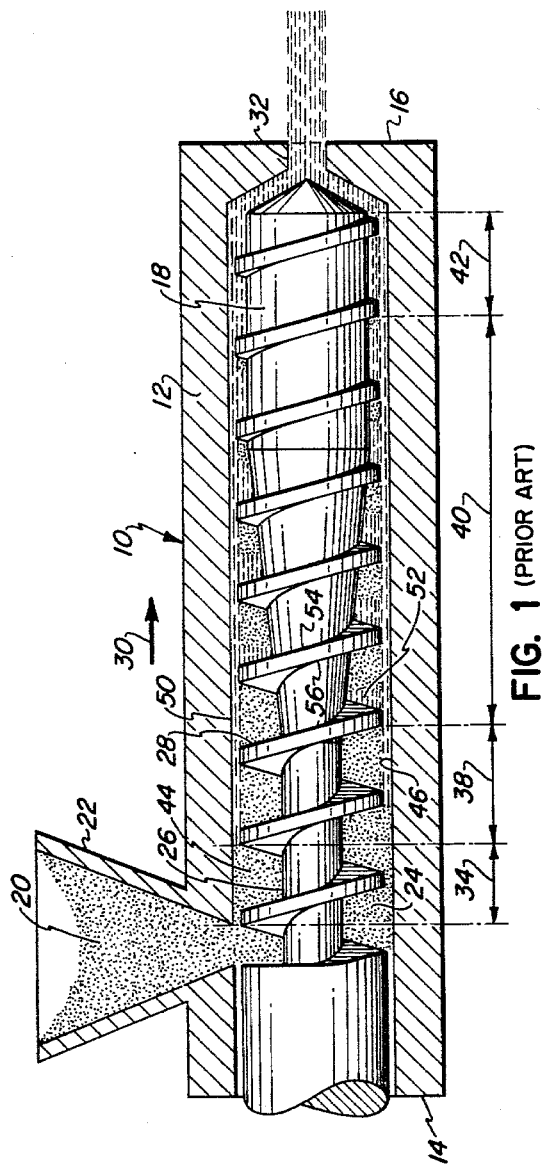

United States Patent [19]

Klein et al.

[11] 4,309,114
[45] Jan. 5, 1982

[54] METHOD FOR ATTAINING MAXIMUM PRODUCTION EFFECTIVENESS IN A PLASTICATING EXTRUDER

[75] Inventors: Reuben Klein, Edison; Imrich Klein, Highland Park, both of N.J.

[73] Assignee: Scientific Process & Research, Inc., Somerset, N.J.

[21] Appl. No.: 120,390

[22] Filed: Feb. 11, 1980

[51] Int. Cl.³ .............................................. B29F 3/00
[52] U.S. Cl. .................................. 366/79; 264/40.4;
264/40.6; 264/40.7; 264/176 R; 264/349;
366/142; 366/145; 366/149
[58] Field of Search ................... 264/40.1, 40.6, 40.7,
264/176 R, 349, 40.3, 40.4; 425/143, 144;
366/79, 142, 145, 149

[56] References Cited

U.S. PATENT DOCUMENTS

| | | | |
|---|---|---|---|
| 2,893,055 | 7/1959 | Wenzel | 264/DIG. 46 |
| 3,283,041 | 11/1966 | Sommerfeld | 425/143 |
| 4,102,958 | 7/1978 | Wertz | 264/40.7 |
| 4,197,070 | 4/1980 | Koschmann | 264/40.6 |

FOREIGN PATENT DOCUMENTS 40-27068 11/1965 Japan .................................... 425/143

OTHER PUBLICATIONS

Klein, Imrich, "Resin Friction . . . ", Plastics World, (Jan. 1979), pp. 47–51.

Primary Examiner—Willard E. Hoag
Attorney, Agent, or Firm—Samuelson & Jacob

[57] ABSTRACT

Apparatus and method in which the temperature of the barrel inner surface and the temperature of the screw conveyor outer surface of a plasticating extruder are varied, alternately, in repeated steps, independent of one another along at least a portion of the solids conveying zone of the extruder, while a production effectiveness parameter simultaneously is monitored, until the monitored production effectiveness parameter is optimized and the production effectiveness of the extruder is at a desired maximum.

4 Claims, 2 Drawing Figures

METHOD FOR ATTAINING MAXIMUM PRODUCTION EFFECTIVENESS IN A PLASTICATING EXTRUDER

The present invention relates generally to the operation of plasticating extruders and pertains, more specifically, to method and apparatus for attaining a desired maximum production effectiveness in a plasticating extruder through improved solids conveying within the extruder.

It is well-known that the output performance of a plasticating extruder or molding machine depends, to a very large extent, upon the geometric construction of the screw conveyor of the extruder. For a given screw conveyor geometry, output performance is directly related to a variety of operating conditions, some of which are the temperature of the screw conveyor, the temperature of the barrel of the extruder, and the speed of rotation of the screw conveyor. The production rate of an extruder can be increased, with improved quality in the extrudate, by providing the appropriate screw conveyor design for a particular operation and then employing optimum operating conditions.

An important aspect which should be considered in attaining an optimum rate of production from an extruder, with a high quality extrudate, is the effectiveness of solids conveying in the solids conveying zone of the extruder. The solids conveying zone of an extruder usually is very short in comparison to the length of the extruder. It begins at the downstream end of the hopper opening and ends further downstream at an axial location where a thin film of melt starts to form along the inner surface of the barrel.

The pressure rise along the solids conveying zone normally is a few pounds per square inch (psi). Such a low pressure is very difficult to measure in an extruder. For that reason, solids conveying generally has been disregarded as a factor in extruder performance. Nevertheless, it is an important factor because the solids conveying zone has a significant effect on the overall performance of the extruder. The pressure within the solids conveying zone must rise sufficiently to compact the solid bed; otherwise, a loosely packed solid bed will include large voids, which will interfere with the formation of the melt film along the barrel surface. Since all melting activity in an extruder takes place within the melt film, discontinuities in the melt film at any point along the extruder channel will tend to lower the output of the extruder.

It has been demonstrated that the frictional properties of a synthetic resin have a direct and important effect on how efficiently the material will be moved through the solids conveying zone of an extruder and, hence, will affect the output rate, melting performance of the extruder, and even the amount of air bubbles present in the extruded product. Maintaining an adequate differential between the coefficients of friction at the screw conveyor outer surface and at the barrel inner surface in the solids conveying zone has been found to be a key factor in attaining efficient solids conveying. It also is known that the coefficient of friction varies with pressure, as well as with the velocity and temperature of these surfaces and that controlling the temperature of the screw conveyor and the barrel in the solids conveying zone is one way in which to adjust the coefficient of friction differential so as to attain effective solids conveying.

It is an object of the present invention to provide method and apparatus by which the temperature of the barrel inner surface and the temperature of the screw conveyor outer surface of a plasticating extruder are varied, alternately, in repeated steps, independent of one another along at least a portion of the solids conveying zone of the extruder, while a production effectiveness parameter simultaneously is monitored, to optimize that parameter, thereby employing a unique arrangement and technique to attain the known advantages of an optimum differential coefficient of friction for effective solids conveying and maximum production effectiveness, as described above.

Another object of the invention is to provide method and apparatus as aforesaid, and wherein the production effectiveness parameter is an easily monitored parameter, such as volumetric flow rate of the extrudate delivered by an extruder, pressure within the barrel of the extruder and power consumption.

Still another object of the invention is to provide method and apparatus which enable the use of conventional plasticating extruders, with minimal modification, to attain greater production effectiveness and higher quality extrudate.

Yet another object of the invention is to provide method and apparatus which lend themselves readily to automated operation in attaining the aforesaid greater production effectiveness and higher quality extrudate.

A further object of the invention is to provide method and apparatus by which known characteristics of a conventional plasticating extruder are utilized to better advantage to attain an increase in production effectiveness, with minimal added expense.

As set forth above, the term "production effectiveness parameter" refers to a parameter which may be monitored to determine the relative effectiveness of the plasticating extruder in producing extrudate, which is a measure of the output of the extruder. The production effectiveness parameters which are preferred because of the ease with which these parameters can be monitored are power consumption (the amount of power consumed in rotating the extruder screw conveyor), pressure in the extruder barrel at a point downstream of the solids conveying zone, and volumetric flow rate of the extrudate delivered by the extruder. The optimum production effectiveness parameter is the maximum observed value of the parameter. In the case of the preferred parameters, the optimum production effectiveness parameter refers to the maximum power consumption, the maximum pressure in the extruder barrel at a point downstream of the solids conveying zone, or the maximum volumetric flow rate of extrudate delivered by the extruder.

The above objects, as well as still further objects and advantages, are attained by the present invention which may be described briefly as the method of, and apparatus for, attaining a desired maximum production effectiveness in a plasticating extruder through improved solids conveying, the plasticating extruder being of the type having a barrel with an inner surface, a screw conveyor with an outer surface, a solid materials feed means for feeding solids into the barrel to the screw conveyor, and a solids conveying zone in which the solids are advanced by the screw conveyor through the barrel in a direction from an upstream end toward a downstream end, the method and apparatus comprising:

means for, and as one step, varying the temperature of the barrel inner surface along at least a portion of the solids conveying zone, independent of the screw conveyor outer surface temperature, while simultaneously monitoring a production effectiveness parameter, until a first optimum is reached for the monitored production effectiveness parameter based upon a particular barrel inner surface temperature;

means for, and as another step, varying the temperature of the screw conveyor outer surface along at least the portion of the solids conveying zone, independent of the barrel inner surface temperature, while simultaneously monitoring the same production effectiveness parameter, until a second optimum is reached for the monitored production effectiveness parameter based upon a particular screw conveyor outer surface temperature; and means for, and the further step of, repeating the one step and the other step, alternately, independent of one another, until a further barrel inner surface temperature and a further screw conveyor outer surface temperature are reached where the monitored production effectiveness parameter is further optimized and the production effectiveness is at the desired maximum.

Figure 2:
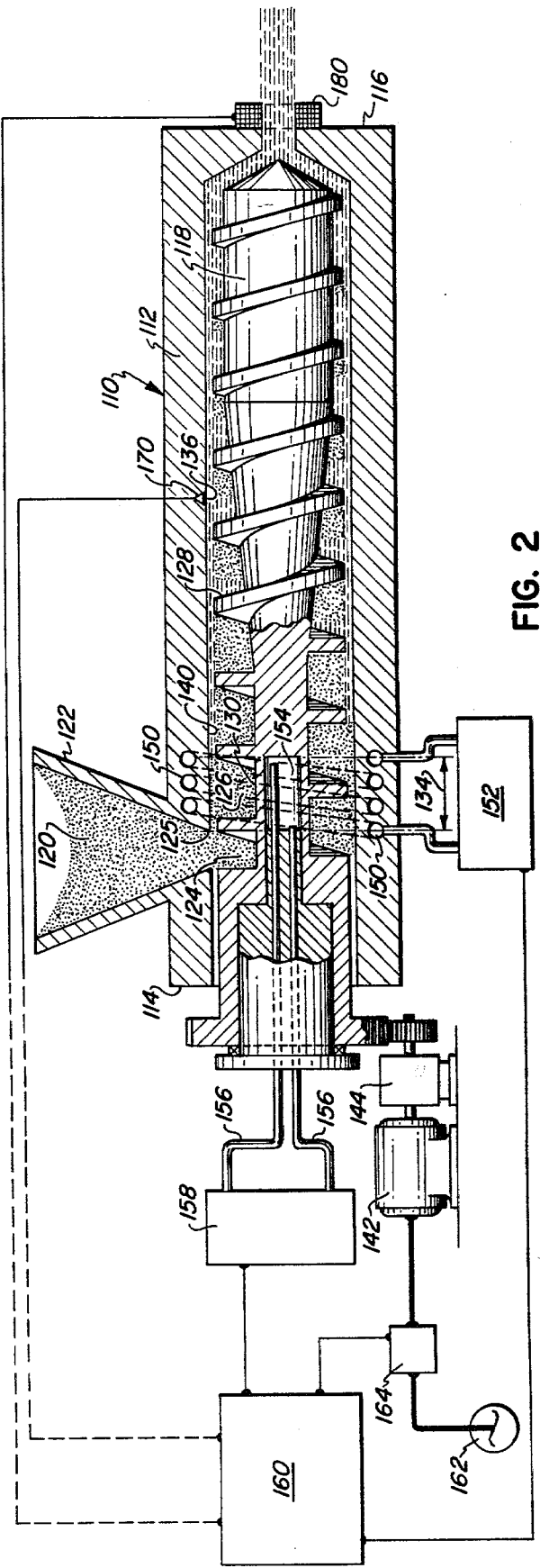

The invention will be understood more fully, while still further objects and advantages will become apparent, in the following detailed description of a preferred embodiment of the invention illustrated in the accompanying drawing, in which:

FIG. 1 is a schematic representation of a typical plasticating extruder now in common use; and FIG. 2 is a schematic representation of a plasticating extruder with a system which employs the method and apparatus of the present invention.

Referring now to the drawing, and especially to FIG. 1 thereof, a plasticating extruder of the type now in common use is illustrated schematically at 10 and is seen to include a barrel 12, extending axially between an upstream end 14 and a downstream end 16, and a screw conveyor 18 in the barrel. The purpose of the illustrated arrangement is to melt, or plasticate, a solid material, or a molten material having a high viscosity at room temperature, and to deliver, or pump, the plasticated material to a further apparatus, such as the mold of a molding machine, a die or the like. It will be understood that the terms "solids" and "solid material", as employed herein, include highly viscous materials which behave similar to solids in the described apparatus as well as actual solid materials. A reservoir of solid material 20 is held in a hopper 22 which communicates with the inner chamber 24 of the barrel 12 adjacent the upstream end 14 and feeds the solid material 20 into a channel 26 defined by a helical flight 28 on the screw conveyor 18. Rotation of the screw conveyor 18 within the barrel 12 will advance the material 20 along the channel 26 in a downstream direction 30 until the material is delivered, in melted form, to a discharge point 32 at the downstream end 16 of the barrel.

Extruder 10 may be divided into several functional zones; namely, a solids conveying zone 34, a delay zone 38, a melting zone 40, and a melt conveying zone 42.

The hopper 22 serves as a reservoir for the solid material 20 and assures that solids are continuously supplied to the extruder. The solids enter the solids conveying zone 34 at the hopper 22 and are conveyed downstream by the screw conveyor 18 to the delay zone 38. The solids conveying zone 34 occupies a portion of the channel 26 where no melting of the solid material 20 takes place. The solids conveying zone 34 begins essentially at the point where solids are fed to the channel 26 by the hopper 22 and extends downstream to the delay zone 38. The function of solids conveying zone 34 is to compact the solids in the channel 26 into a solid bed 44.

The delay zone 38 starts at the point where the inner surface 46 of the barrel 12 reaches the melting point of the material 20, either as a result of heat conducted through a heated barrel, or because of frictional heat generated by the solid bed 44 rubbing against the barrel. The melt generated at the inner surface 46 of the barrel 12 forms a continuous film 50, provided that the solid bed 44 is sufficiently compacted. Compacting of the solid bed 44 depends upon the effectiveness of the solids conveying zone 34. Over the whole length of the delay zone 38, melt appears only in the film 50 between the solid bed 44 and the inner surface 46 of the barrel 12.

The melting zone 40 begins at the point where the delay zone 38 ends and where a melt pool 52 starts to form, cross-channel between the leading face 54 of the flight 28, which faces downstream, and the confronting trailing face 56 of the flight 28, which faces upstream. The melt pool 52 is juxtaposed with the leading face 54 of the flight 28 and gradually replaces the progressively melting solid bed 44 throughout the length of the melting zone 40. The melting zone 40 usually occupies the major portion of the length of the extruder 10.

The melt conveying zone 42 is the last functional zone of the extruder 10 and identifies the portion of the extruder where essentially no unmelted solids remain. In zone 42, melted material is pumped to the discharge point 32 at end 16 of the barrel.

As described above, an important aspect to be considered in attaining an optimum rate of production from an extruder, whether a single-screw extruder, such as extruder 10, or a twin-screw extruder, while assuring that the extrudate is of high quality, is the effectiveness of the solids conveying zone in compacting the solids into a solid bed 44 and conveying the compacted solids downstream. In an article entitled "Resin Friction 'Hidden Force' In Extrusion Output", by Dr. Imrich Klein, published in the January, 1979, issue of Plastics World, it is demonstrated that the frictional properties of a synthetic resin material can affect the efficiency with which the solid materials will move through the solids conveying zone. The article points out that the maintenance of an adequate differential between the coefficients of friction at the screw conveyor outer surface and at the barrel inner surface in the solids conveying zone has been found to be a key factor in attaining effective solids conveying. The article further demonstrates the effect of temperature on the coefficient of friction and suggests that solids conveying can be improved by controlling the temperature of the screw conveyor and the barrel in the solids conveying zone.

Upon further investigation, we have devised a practical system, including a method and apparatus, by which the temperature of both the barrel inner surface and the screw conveyor outer surface of an extruder is controlled during operation of the extruder to attain a desired maximum production effectiveness in the extruder. Our system is based upon a novel approach which is described in connection with FIG. 2.

A plasticating extruder 110 is constructed similar to the earlier-described extruder 10 in that extruder 110 includes a barrel 112, extending axially between an upstream end 114 and a downstream end 116, and a screw conveyor 118 in the barrel 112. A reservoir of solid material 120 is held in a hopper 122 which communicates with the inner chamber 124 of barrel 112 through an opening 125 located in the barrel adjacent the upstream end 114 and feeds the solid material 120 into a channel 126 defined by the helical flight 128 which extends along the outer surface 130 of the screw conveyor 118.

The solids conveying zone 134 of extruder 110 begins at the downstream end of opening 125 and extends further downstream to an axial location where the thin film of melt starts to form along the inner surface 140 of the barrel 112, as described above in connection with extruder 10. Screw conveyor 118 is rotated within barrel 112 by an electric motor 142 coupled to the screw conveyor 118 through a drive 144.

The temperature of the barrel inner surface 140 may be varied by means of a heat exchange passage 150 which extends circumferentially around the barrel 112 and axially along length corresponding generally to the length of the solids conveying zone 134. A heat exchange medium, such as water or oil, is circulated through passage 150 and is heated or cooled, in order to raise or lower the temperature of the barrel inner surface 140, by a heating and cooling device 152. In a similar manner, the temperature of the outer surface 130 of screw conveyor 118 may be varied by means of a heat exchange passage 154 which extends axially along a length of the screw conveyor 118 corresponding generally to the length of the solids conveying zone 134. A heat exchange medium, such as water or oil, is circulated through passage 154 by conduits 156 interconnected with a heating and cooling device 158 which heats or cools the heat exchange medium to raise or lower the temperature of the screw conveyor outer surface 130.

It is not considered practical, under the wide variety of operating conditions encountered in the field, to measure the coefficient of friction at the inner surface of the barrel and the coefficient of friction at the outer surface of the screw conveyor for a particular material at various surface temperatures in order to select the appropriate surface temperatures for keeping the coefficient of friction at the barrel inner surface high and for keeping the coefficient of friction at the screw conveyor outer surface low, to attain the maximum rate of solids conveying in the solids conveying zone. However, we have determined that actual measurement of these coefficients of friction is not necessary, and we have devised method and apparatus capable of use during production, under factory conditions, to improve solids conveying and thereby attain a desired maximum production effectiveness.

Our method and apparatus is based upon our observation that production effectiveness can be determined through the measurement of any one of several easily-measured parameters, which we refer to as production effectiveness parameters, and that such a production effectiveness parameter can be monitored readily during production. Typical easily-measured production effectiveness parameters are power consumed in the operation of the extruder, pressure in the barrel at any location downstream of the solids conveying zone, and the volumetric flow rate of extrudate delivered by the extruder. Production effectiveness can be brought to a maximum by first varying the temperature of either one of the barrel inner surface or the screw conveyor outer surface, while simultaneously monitoring a production effectiveness parameter, until the monitored production effectiveness parameter is brought to a first optimum value. Then the temperature of the other of the barrel inner surface or the screw conveyor outer surface is varied, while the same production effectiveness parameter is monitored, until a second optimum value for the production effectiveness parameter is reached. In each of the aforesaid steps, the temperature of one of the surfaces is varied independent of the temperature of the other of the surfaces and the production effectiveness parameter is optimized independently for each step. The steps are repeated, alternately, independent of one another, until a barrel inner surface temperature is reached and until a screw conveyor outer surface temperature is reached where the monitored production effectiveness parameter is brought to a full optimum value, thereby indicating that the production effectiveness of the extruder is at the desired maximum.

Referring still to FIG. 2, the temperature of the inner surface 140 of the barrel 112 along the solids conveying zone 134 is regulated by the temperature of the heat exchange medium circulated through passage 150. The temperature of the heat exchange medium is determined by the heating and cooling device 152 which, in turn is controlled by a controller 160. The temperature of the outer surface 130 of screw conveyor 118 is regulated by the temperature of the heat exchange medium circulated through passage 154. The temperature of that heat exchange medium is determined by heating and cooling device 158 which, in turn, is controlled by controller 160.

Motor 142 receives power from a power source 162. The power consumed by motor 142 during operation of extruder 110 is monitored by a power meter 164 which transmits power consumption information to controller 160. The power consumed by motor 142 is related directly to the production effectiveness of the extruder. Thus, greater production effectiveness in the extruder is reflected in greater power consumption. In order to attain maximum production effectiveness, controller 160 is programmed to operate each heating and cooling device 152 and 158 as follows: as a first step, controller 160 operates heating and cooling device 152 to vary the temperature of the heat exchange medium circulated through passage 150, thereby effecting a variation in the temperature of the barrel inner surface 140. Simultaneously, power consumption is monitored by meter 164 and power consumption information is furnished to controller 160. When the monitored power consumption reaches a first optimum value, that is, when power consumption is at a maximum, controller 160 discontinues the variation of the temperature of the heat exchange medium in passage 150, thereby discontinuing the variation of the temperature of the inner surface 140 of barrel 112 along the solids conveying zone 134. Then, as a second step, controller 160 operates the other heating and cooling device 158 to vary the temperature of the heat exchange medium circulated through passage 154, thereby effecting a variation in the temperature of the outer surface 130 of screw conveyor 118. Simultaneously, power consumption is monitored by meter 164 and power consumption information is furnished to controller 160. When the monitored power consumption reaches a second optimum value, that is, when power consumption is at a maximum for variations in the screw conveyor outer surface temperature, controller 160 discontinues variation of the temperature of the heat exchange medium in passage 154, thereby discontinuing the variation of the temperature of outer surface 130 of the screw conveyor 118. The first step then is repeated, followed by a repeat of the second step so that the first and second steps are repeated alternately, independent of one another, until the temperature of the inner surface 140 of barrel 112 and the temperature of the outer surface 130 of the screw conveyor 118 each reach a value where the monitored power consumption is at an ultimate optimum value. In that manner, production effectiveness is at the desired maximum. Thus, maximum production effectiveness is attained, through improved solids conveying, without requiring the measurement of coefficients of friction, utilizing the simplified approach of monitoring a production effectiveness parameter while independently varying the temperatures of the surfaces which affect the coefficients of friction, in alternate, independent steps which are accomplished readily during production.

Although the embodiment illustrated in FIG. 2 shows power consumption as the monitored production effectiveness parameter, other parameters are available for monitoring. Thus, as one alternate, a pressure sensor 170 may be located in the barrel 112 at a downstream location 136, downstream of the solids conveying zone 134, to measure and transmit information pertaining to the pressure in the barrel 112 at that location. Maximum pressure at that location indicates maximum effectiveness in solids conveying; hence, the pressure may be monitored by pressure sensor 170 and pressure information supplied to controller 160 to enable controller 160 to act upon pressure information in a manner similar to operation in response to power consumption information.

As another alternate, a flow meter 180 may be located adjacent the downstream end 116 of the extruder 110 to measure the volumetric flow rate of extrudate emanating from the extruder and to transmit flow rate information to controller 160. Maximum flow rate is a measure of maximum production effectiveness; hence, the flow rate may be monitored by flow meter 180 and flow rate information furnished to controller 160 to enable controller 160 to act upon flow rate information in a manner similar to that described in connection with power consumption information.

In each of the above alternative arrangements, an easily-measured production effectiveness parameter is monitored, during production, and the information derived therefrom is utilized in a simplified method and apparatus which enables maximum production effectiveness to be achieved, under factory conditions, while an extruder is in operation. The extruder may be a single-screw extruder or a twin-screw extruder. A wide variety of materials thus can be processed in a particular extruder, each at maximum effectiveness.

It is to be understood that the above detailed description of an embodiment of the invention is provided by way of example only. Various details of design and construction may be modified without departing from the true spirit and scope of the invention as set forth in the appended claims.

The embodiments of the invention in which an exclusive property or privilege is claimed are defined as follows:

1. The method of attaining a desired maximum production effectiveness in a plasticating extruder through improved solids conveying, and operating the plasticating extruder at said maximum production effectiveness, the plasticating extruder being of the type having a barrel with an inner surface, a screw conveyor with an outer surface, a solid materials feed means for feeding solids into the barrel to the screw conveyor, and a solids conveying zone in which the solids are advanced by the screw conveyor through the barrel in a direction from an upstream end toward a downstream end during operation of the plasticating extruder, said method comprising:

as one step, operating the plasticating extruder while varying the temperature of the barrel inner surface along at least a portion of the solids conveying zone, independent of the screw conveyor outer surface temperature, while simultaneously monitoring a production effectiveness parameter, until a first optimum is reached for the monitored production effectiveness parameter based upon a particular barrel inner surface temperature;

as another step, operating the plasticating extruder while varying the temperature of the screw conveyor outer surface of at least said portion of the solids conveying zone, independent of the barrel inner surface temperature, while simultaneously monitoring the same production effectiveness parameter, until a second optimum is reached for the monitored production effectiveness parameter based upon a particular screw conveyor outer surface temperature;

repeating said one step and said other step, alternately, independent of one another, until a further barrel inner surface temperature and a further screw conveyor outer surface temperature are reached at which the monitored production effectiveness parameter is further optimized such that the production effectiveness is at the desired maximum; and continuing operation of the plasticating extruder with the barrel inner surface essentially at said further barrel inner surface temperature and the screw conveyor outer surface at said further screw conveyor outer surface temperature, thereby operating the plasticating extruder at said maximum production effectiveness.

2. The invention of claim 1 wherein the production effectiveness parameter is power consumption, and each optimum reached for the monitored production effectiveness parameter is the maximum power consumption measured during each step.

3. The invention of claim 1 wherein the production effectiveness parameter is pressure in the barrel downstream of the solids conveying zone, and each optimum reached for the monitored production effectiveness parameter is the maximum pressure measured during each step.

4. The invention of claim 1 wherein the production effectiveness parameter is the volumetric flow rate of plasticated material delivered by the extruder, and each optimum reached for the monitored production effectiveness parameter is the maximum volumetric flow rate measured during each step.

* * * * *